(12) United States Patent
Nagaishi et al.

(10) Patent No.: US 10,444,340 B2
(45) Date of Patent: Oct. 15, 2019

(54) MILLIMETER-WAVE ANTENNA AND MILLIMETER-WAVE SENSOR USING THE SAME

(71) Applicant: HITACHI AUTOMOTIVE SYSTEMS, LTD., Hitachinaka-shi, Ibaraki (JP)

(72) Inventors: Hideyuki Nagaishi, Tokyo (JP); Akira Kuriyama, Tokyo (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 15/775,445

(22) PCT Filed: Sep. 2, 2016

(86) PCT No.: PCT/JP2016/075767
§ 371 (c)(1),
(2) Date: May 11, 2018

(87) PCT Pub. No.: WO2017/115494
PCT Pub. Date: Jul. 6, 2017

(65) Prior Publication Data
US 2018/0267161 A1    Sep. 20, 2018

(30) Foreign Application Priority Data
Dec. 28, 2015    (JP) ................. 2015-257214

(51) Int. Cl.
*H01Q 1/38*    (2006.01)
*H01Q 13/02*    (2006.01)
(Continued)

(52) U.S. Cl.
CPC ............. *G01S 13/58* (2013.01); *G01S 7/03* (2013.01); *H01P 5/107* (2013.01); *H01Q 1/38* (2013.01);
(Continued)

(58) Field of Classification Search
CPC . G01S 13/58; G01S 7/03; H01P 5/107; H01Q 13/02; H01Q 13/0275; H01Q 15/08;
(Continued)

(56) References Cited

U.S. PATENT DOCUMENTS 5,061,943 A * 10/1991 Rammos .................. H01Q 1/38
343/770
5,600,286 A *  2/1997 Livingston ................ H01P 5/08
333/26
(Continued)

FOREIGN PATENT DOCUMENTS

JP    2000-252711 A    9/2000
JP    2002-124822 A    4/2002
(Continued)

OTHER PUBLICATIONS

International Search Report of PCT/JP2016/075767 dated Nov. 8, 2016.

*Primary Examiner* — Tho G Phan
(74) *Attorney, Agent, or Firm* — Mattingly & Malur, PC

(57) ABSTRACT

A millimeter-wave antenna includes a slit which is provided in a GND conductor formed in a first surface of a circuit board, a horn antenna which is provided with a first opening and a second opening, and an impedance matching device which is provided in a slot shape between the slit and the first opening of the horn antenna. The impedance matching device is formed in the slot shape which is filled with a dielectric having a dielectric constant different from that of the circuit board. The impedance matching device is configured such that a length of the slot shape in a propagation direction is less than ¼ of a wavelength of a use frequency upper limit. The impedance matching device is configured such that a size of a rectangular shape of the slot shape in a magnetic field direction is larger than the first opening of the horn antenna.

12 Claims, 14 Drawing Sheets

(51) Int. Cl.
*H01Q 15/08* (2006.01)
*G01S 13/58* (2006.01)
*H01P 5/107* (2006.01)
*G01S 7/03* (2006.01)
*H01Q 19/08* (2006.01)

(52) U.S. Cl.
CPC ............ *H01Q 13/02* (2013.01); *H01Q 15/08* (2013.01); *H01Q 19/08* (2013.01); *H01Q 13/0275* (2013.01)

(58) Field of Classification Search
CPC ........... H01Q 19/08; H01Q 1/38; H01Q 3/26; H01Q 21/00; H01Q 21/065
See application file for complete search history.

(56) References Cited

U.S. PATENT DOCUMENTS

| | | | |
|---|---|---|---|
| 6,486,748 B1 | 11/2002 | Stones et al. | |
| 7,193,578 B1 * | 3/2007 | Harris | H01Q 1/38 343/767 |
| 7,486,156 B2 | 2/2009 | Lee et al. | |
| 7,750,755 B2 * | 7/2010 | Fujita | H01P 5/107 333/26 |
| 8,089,327 B2 * | 1/2012 | Margomenos | H01P 5/107 333/128 |
| 8,878,719 B2 | 11/2014 | Nakabayashi et al. | |
| 9,285,462 B2 | 3/2016 | Nakabayashi et al. | |
| 10,283,832 B1 * | 5/2019 | Chayat | H01O 13/18 |
| 2008/0266196 A1 * | 10/2008 | Shi | H01P 5/107 343/772 |

FOREIGN PATENT DOCUMENTS

| | | |
|---|---|---|
| JP | 2009-206686 A | 9/2009 |
| JP | 4648292 B2 | 3/2011 |
| JP | 2012-052928 A | 3/2012 |
| JP | 2012-222507 A | 11/2012 |
| WO | 01/41257 A1 | 6/2001 |
| WO | 2015/182325 A1 | 12/2015 |

* cited by examiner

[FIG. 1]
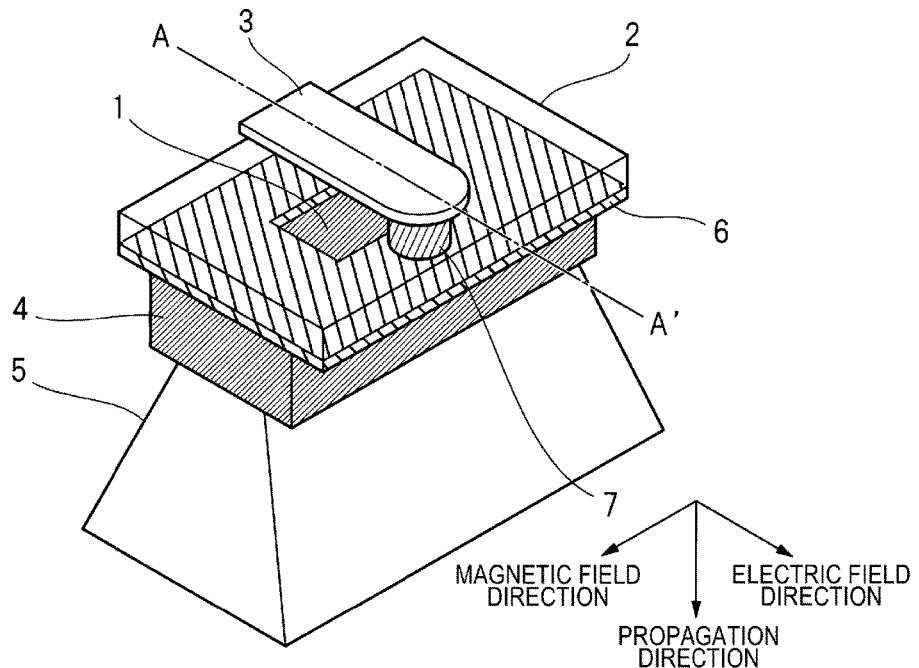
[FIG. 2]
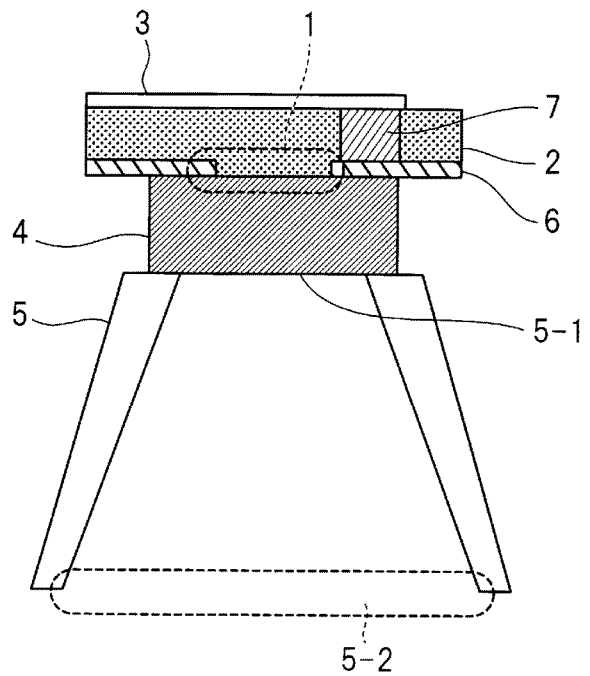

[FIG. 3]
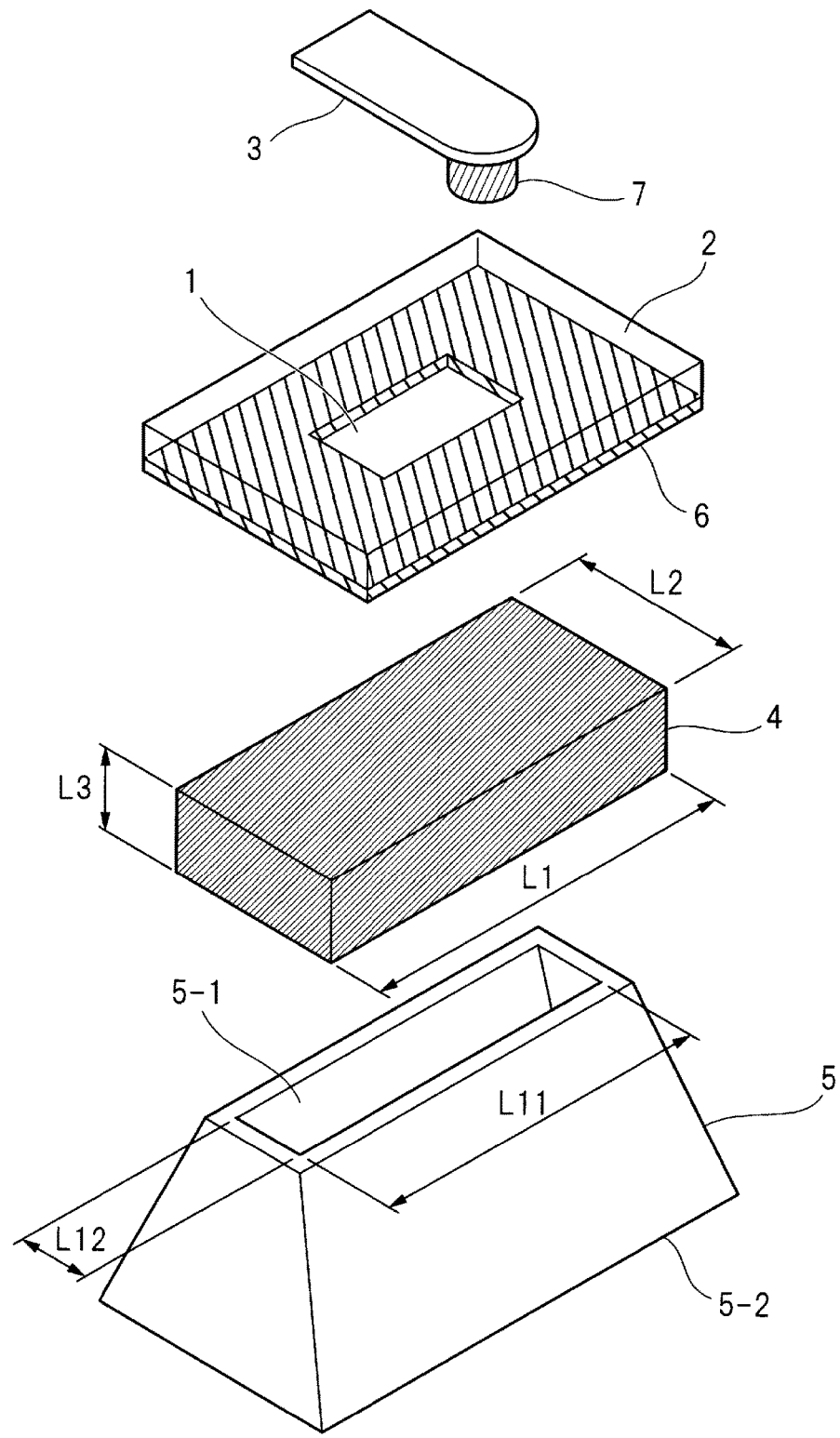

[FIG. 4]
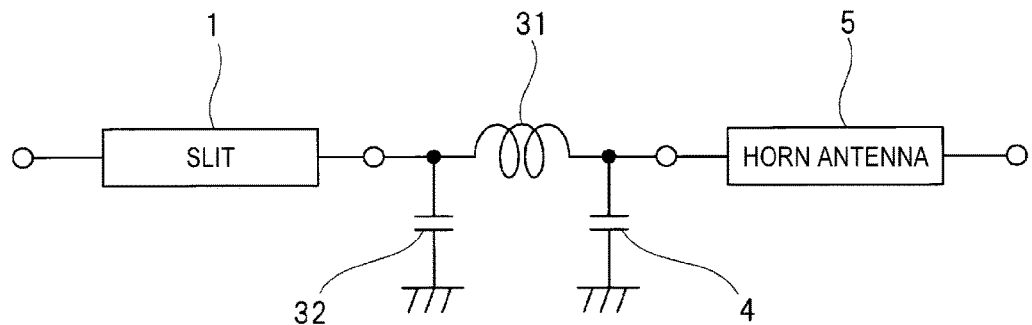
[FIG. 5]
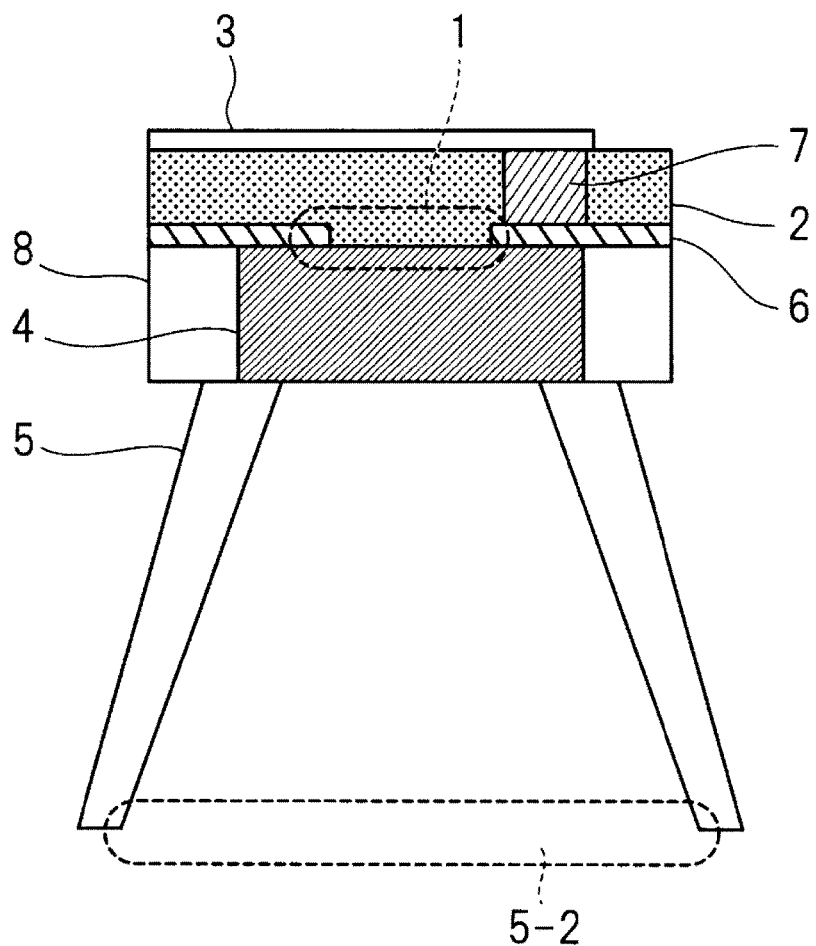

[FIG. 6]
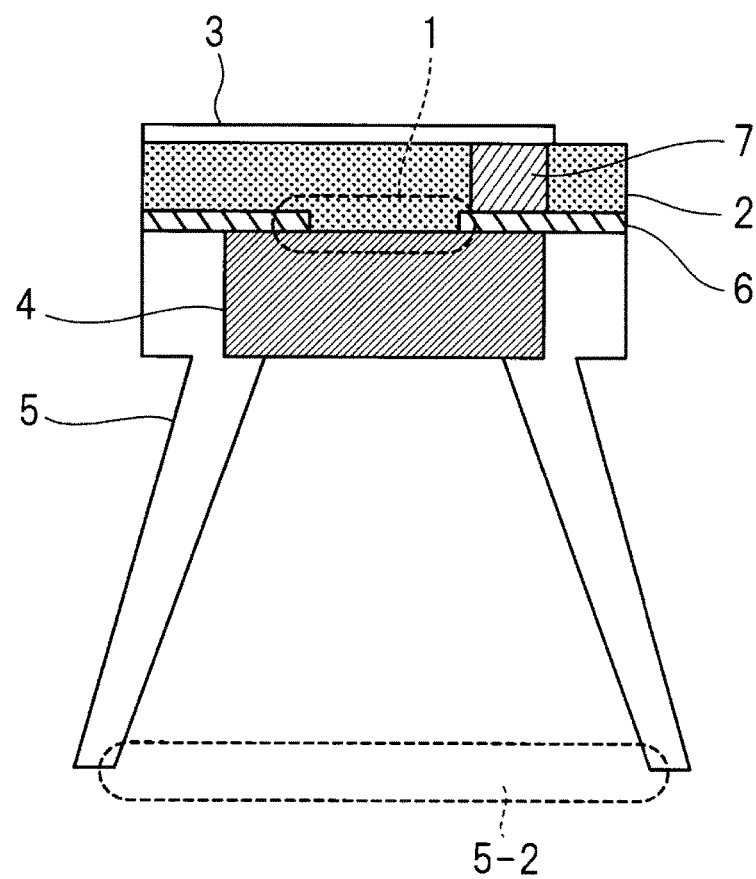

[FIG. 7]
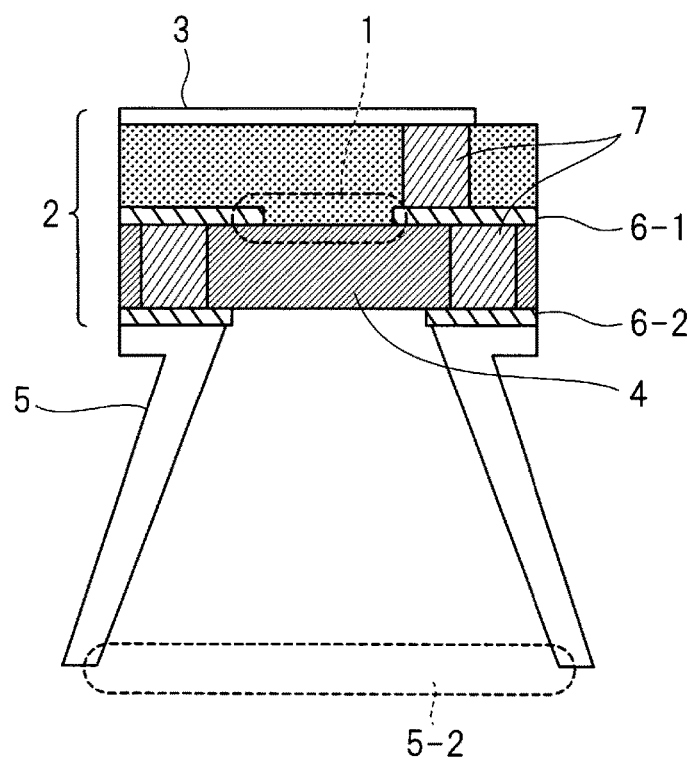

[FIG. 8]
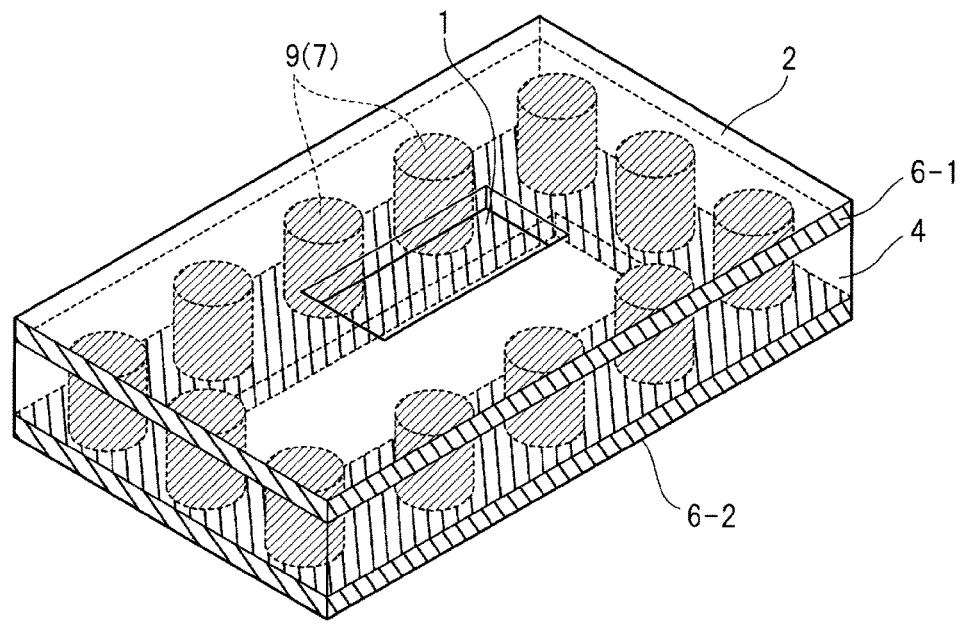
[FIG. 9]
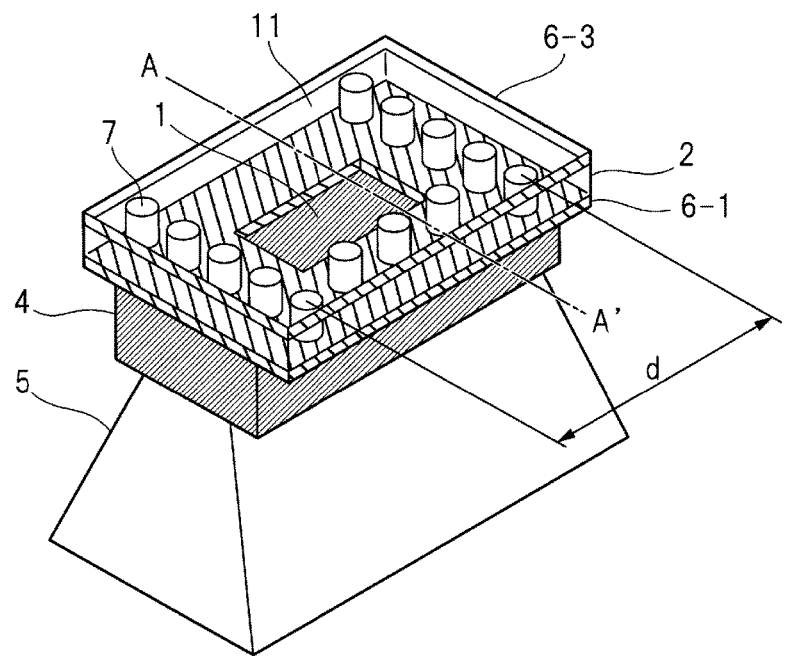

[FIG. 10]
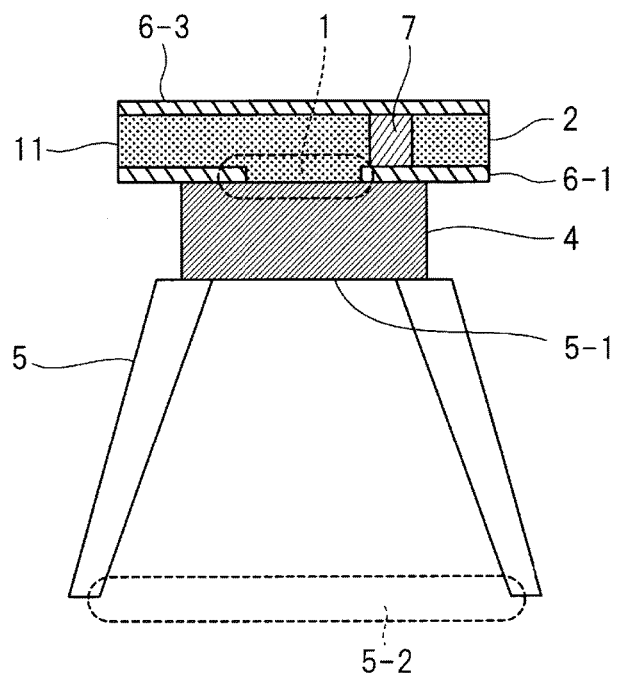
[FIG. 11]
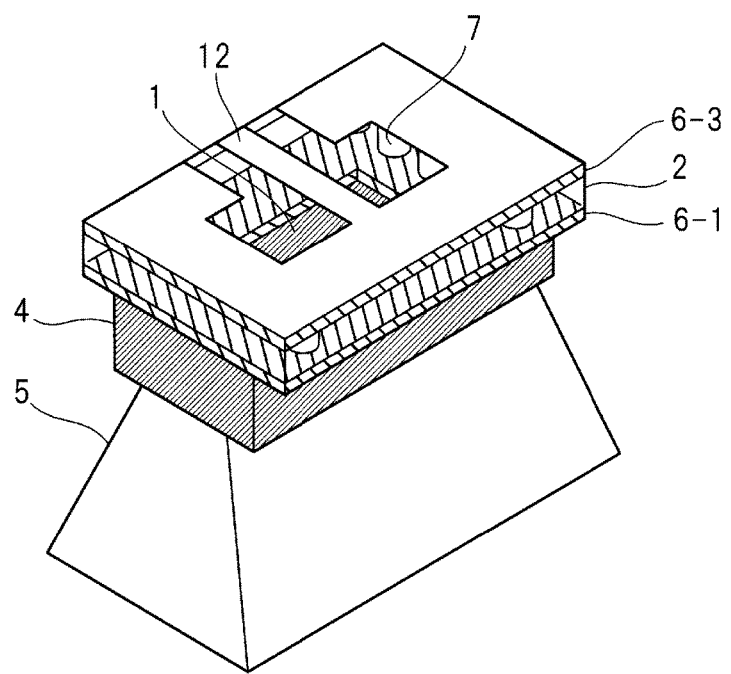

[FIG. 12]
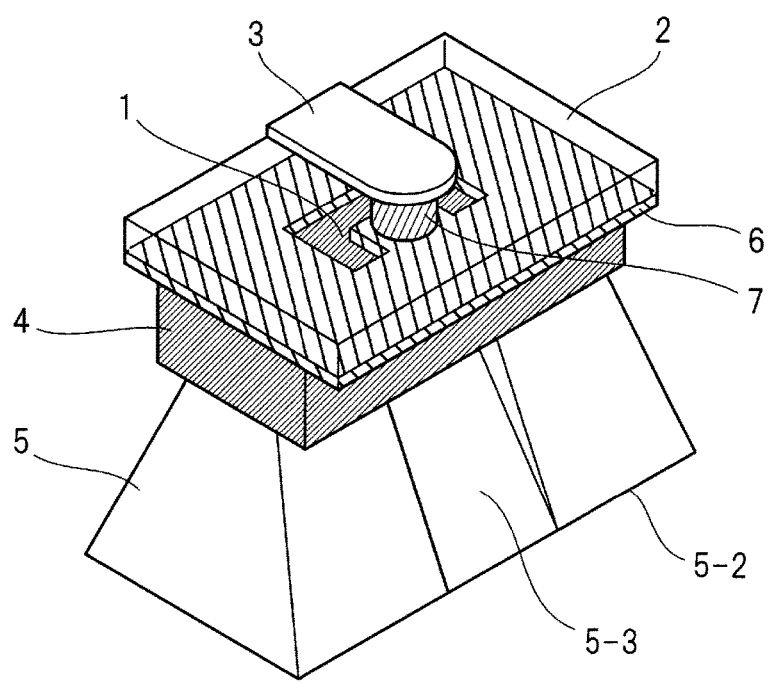

[FIG. 13]
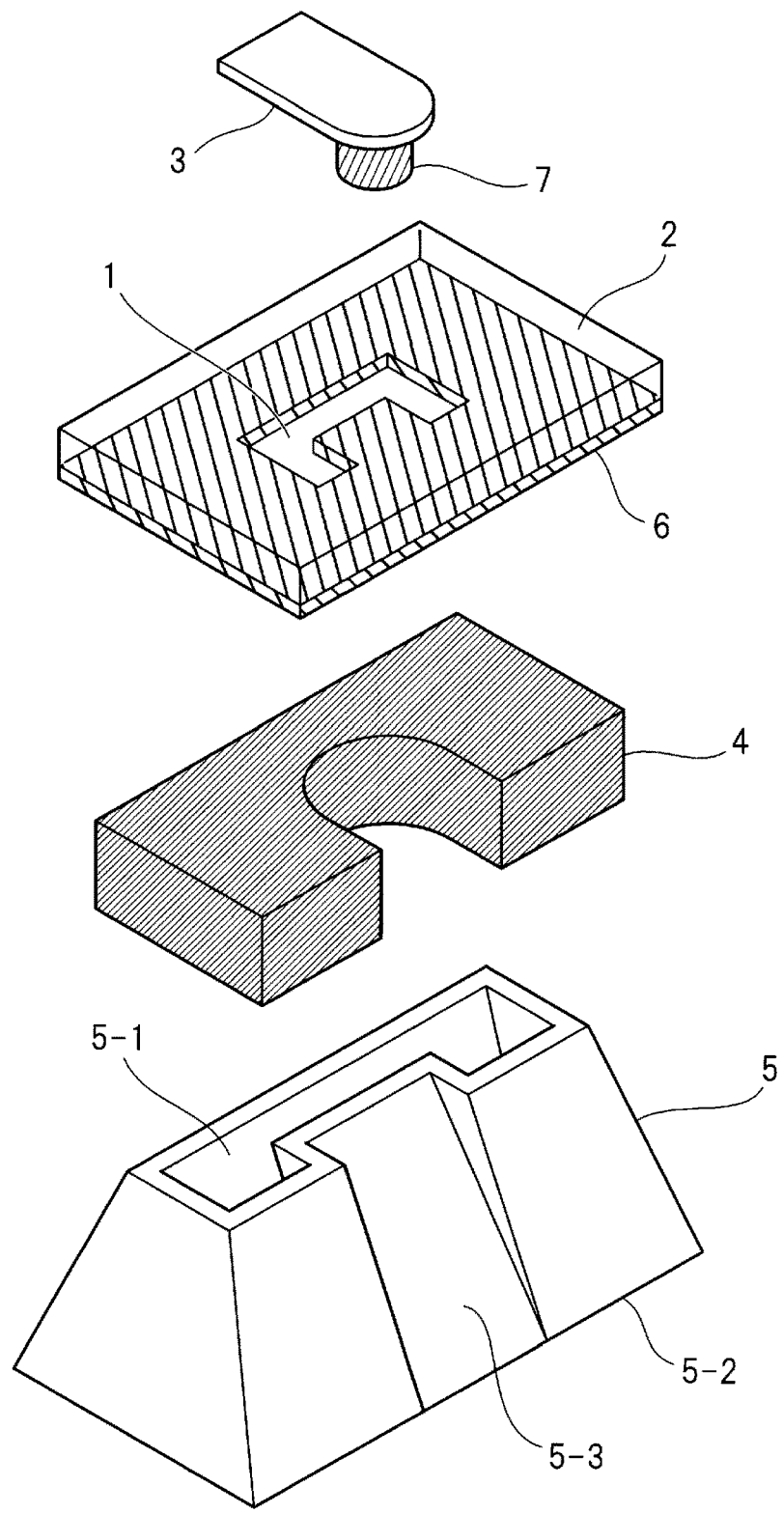

[FIG. 14]
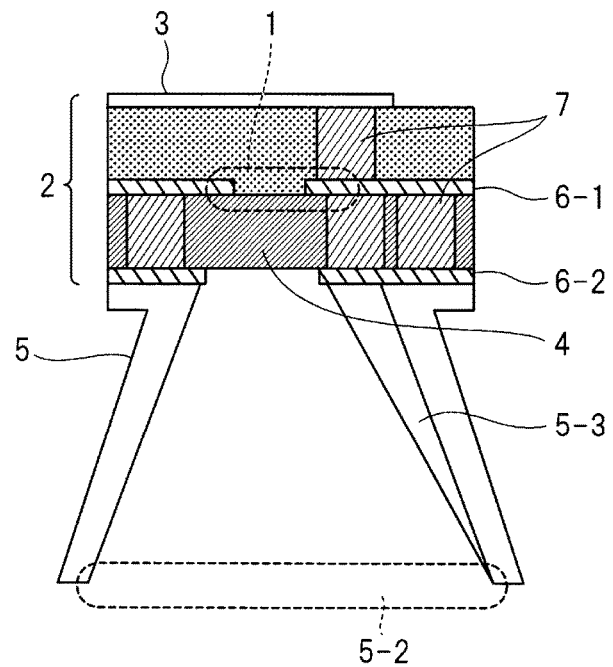
[FIG. 15]
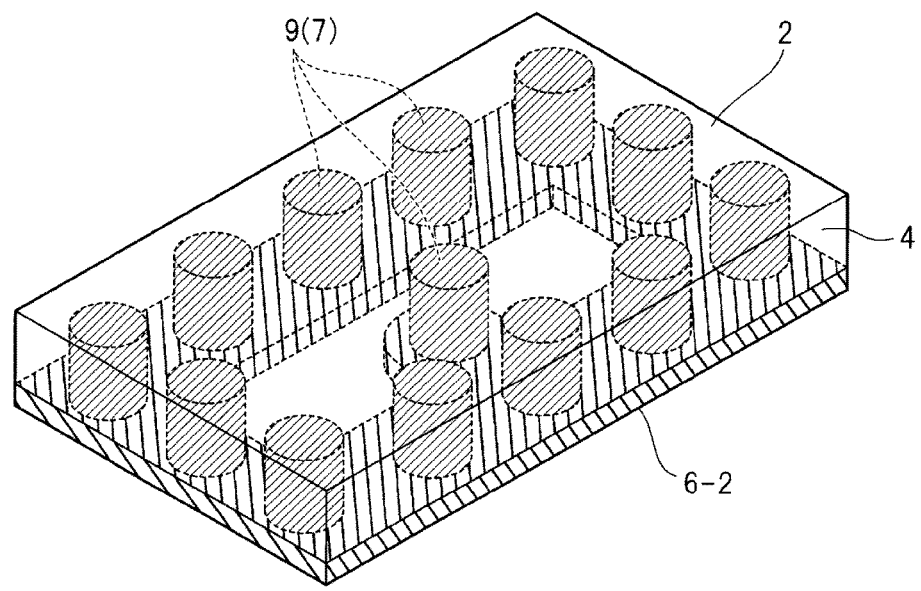

[FIG. 16]
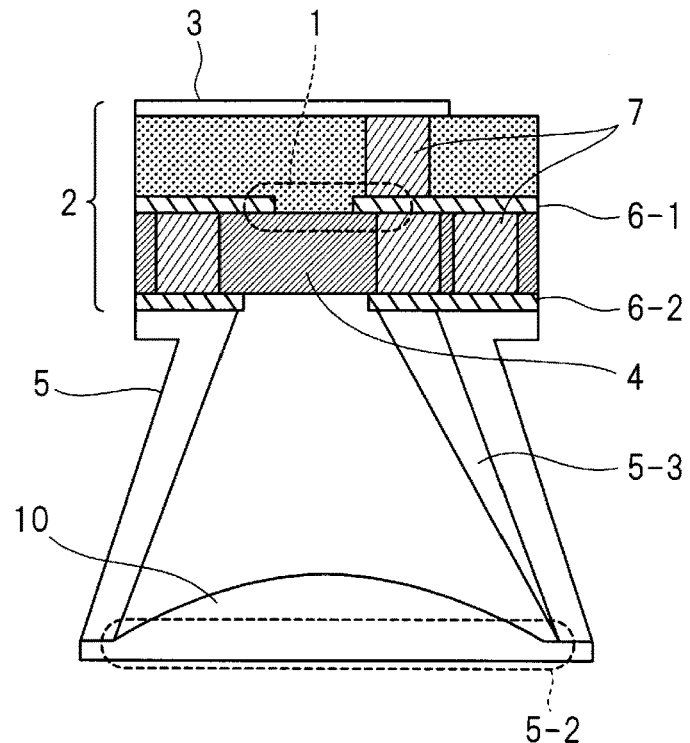
[FIG. 17]
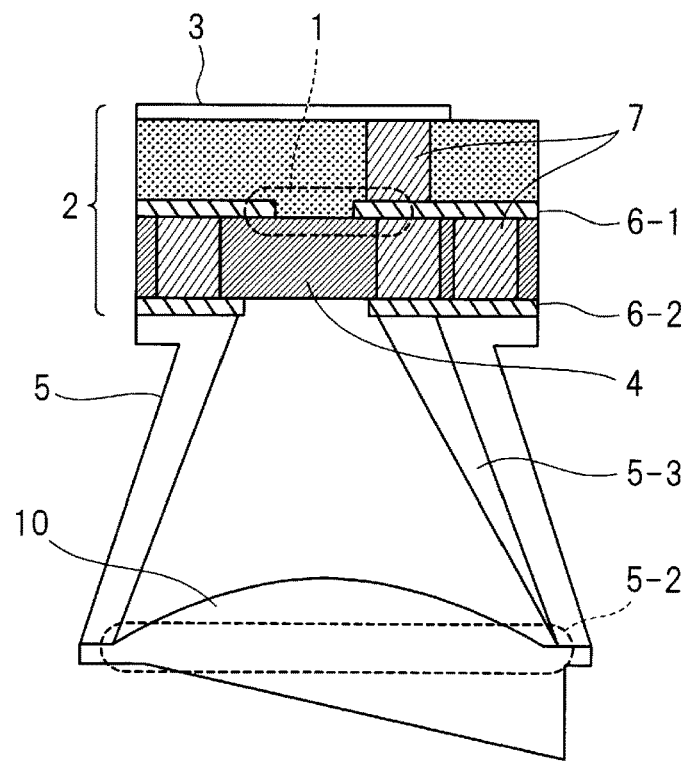

[FIG. 18]
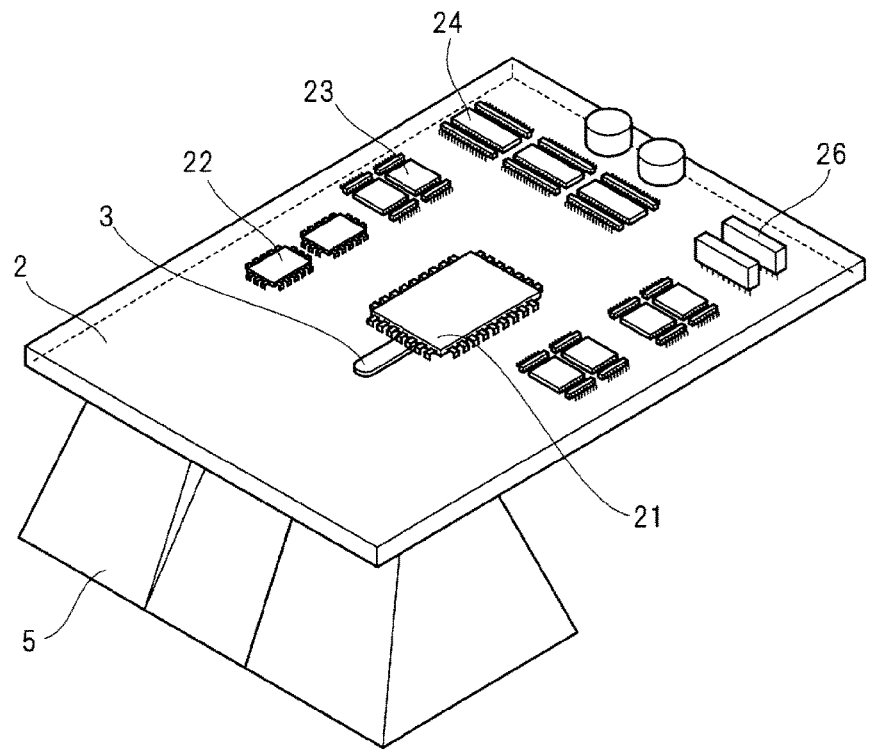
[FIG. 19]
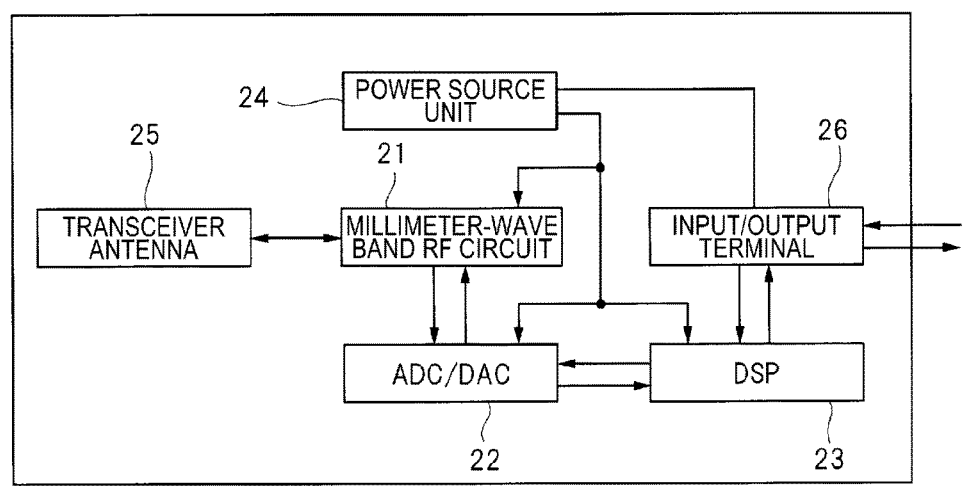

[FIG. 20]
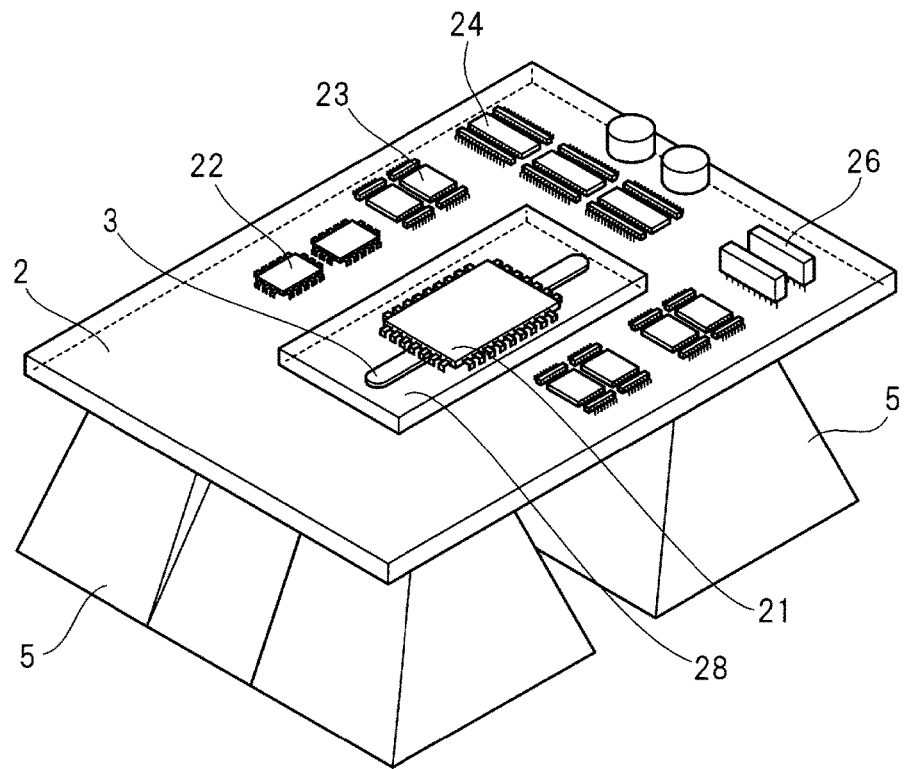
[FIG. 21]
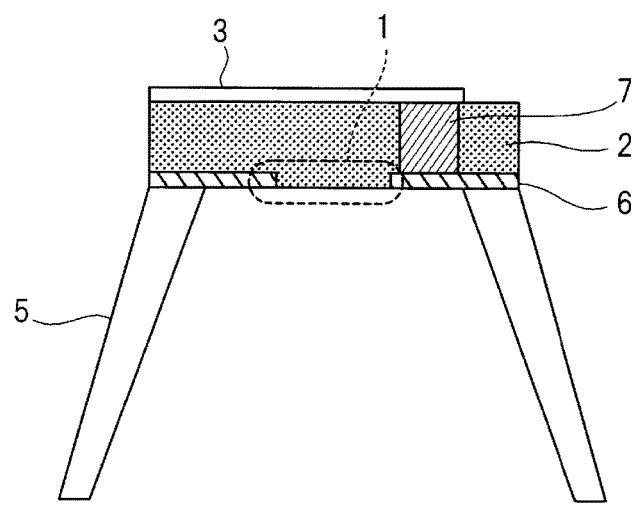

[FIG. 22]
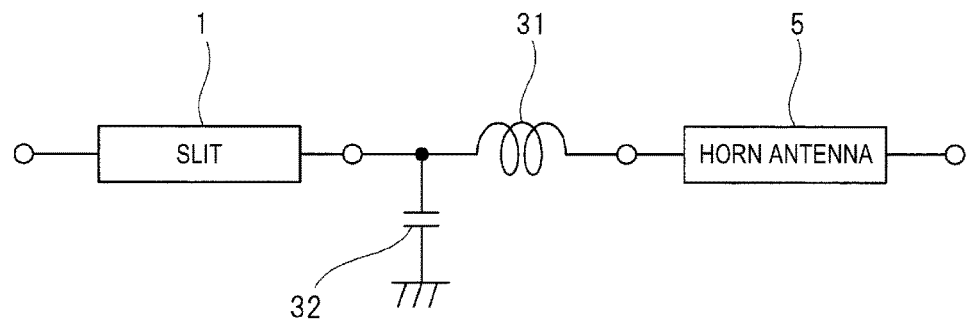

MILLIMETER-WAVE ANTENNA AND MILLIMETER-WAVE SENSOR USING THE SAME

TECHNICAL FIELD

The present invention relates to a millimeter-wave antenna which radiates an electromagnetic wave of a millimeter bandwidth, and a millimeter-wave sensor which uses the millimeter-wave antenna.

BACKGROUND ART

A characteristic impedance of the air is about 377Ω which can be roughly calculated from a dielectric constant $\varepsilon_0$ and a magnetic permeability $\mu_0$ in a vacuum state. With this regard, a characteristic impedance used in a high-frequency circuit is 50 Ω-series. A resonant antenna system is used which is represented by a dipolar antenna in which an impedance ratio of these impedances is large by six times (a voltage standing wave ratio VSWR=7.5), and an antenna length of $\lambda/2$ is used for radiation from the 50 Ω-series transmission line to the air. A patch element frequently employed in the millimeter-wave band is also an antenna of which the size of conductor becomes a length of $\lambda/2$ for resonance.

The patch antenna can be fabricated on a conductor surface on a plate board. Therefore, thinning and cost down can be easily achieved. An opening area having a gain of 20 dBi or more in the millimeter-wave band (76 GHz) is necessarily formed in a size of about 5 cm. There are various types of power feeding circuits such as a tournament type, a branch type (PTL 1), a series fed type (PTL 2) in order to efficiently radiate the millimeter wave from the patch element disposed in the entire area. The power feeding circuit is designed using a $\lambda/4$ matching device many times in order to distribute power from one power feeding point to the patch element while achieving an impedance matching. Therefore, in a patch array antenna which uses the patch element and the $\lambda/4$ matching device, a frequency bandwidth for a good reflection characteristic (hereinafter, abbreviated as use bandwidth) is about 5% of a carrier frequency.

With this regard, a horn antenna using a waveguide pipe has a bypass characteristic at a frequency higher than a cut-off frequency, and thus has a wide bandwidth. However, a characteristic impedance of the waveguide pipe is 300Ω high, and a reflection coefficient with respect to the connection with a 50 Ω-series transmission path is large. As a countermeasure, a millimeter-band transceiver (PTL 4) is considered in which a plurality of microstrip-waveguide pipe converters (PTL 3) and a plurality of $\lambda/4$ matching devices are used through a resonator of the patch element. The patch element and the $\lambda/4$ matching device used in these structures are provided in a metal conductor of a multilayered board. In order to achieve a wide bandwidth even in such a conversion structure, there are employed a method in which a plurality of patch elements having different resonant frequencies and a method of disposing a plurality of $\lambda/4$ matching devices in a stepped manner so as to reduce a variation of a characteristic impedance. The number of layers of the multilayered board and a processing cost are inevitably increased.

In the horn antenna, there is an antenna which is provided with a ridge structure in a signal input portion and reduced in impedance. A waveguide pipe structure has a cut-off frequency, and has an electrical characteristic such as a bypass characteristic of a wide bandwidth. In the horn antenna with ridge fabricated in general, the input portion of the transmission line is configured in a coaxial structure. Even though there is a parasitic component generated from a difference between the coaxial structure and the metal conductor of the ridge structure, a phase variation is less in a microwave band in which the wavelength is 1 cm or more, and thus there is less influence on the 50 Ω-series transmission path.

CITATION LIST

Patent Literature

PTL 1: JP-A-2012-222507
PTL 2: JP-A-2012-52928
PTL 3: U.S. Pat. No. 7,486,156
PTL 4: Japanese Patent No. 4648292

SUMMARY OF INVENTION

Technical Problem

In a technique disclosed in PTL 3, a slit is used as a radiating element when the transmission line such as a microstrip line is connected to the horn antenna. An opening shape of the slit is rectangular, and the transmission line of the bypass characteristic has the cut-off frequency. Therefore, a wide bandwidth is expected in the radiating element. Since the wavelength is compressed by a dielectric constant, a long side dimension of the rectangular opening of the slit is made small.

On the other hand, the size of the long side of the rectangular opening of the horn antenna is necessarily set to have a length of $\lambda/2$ or more in order to be the cut-off frequency which is sufficiently lower than the use frequency. For the purpose of a wide bandwidth, an aspect ratio of the rectangular opening of the horn antenna is set such that the length in an electric field direction is shortened (to increase the capacity) as a characteristic impedance of the horn antenna approaches the slit. Therefore, in a connection portion where the slit and the opening of the horn antenna are directly overlapped, the impedance viewed from the slit is considered as a line (a low-impedance line) of which the capacitive performance is increased. On the contrary, when viewed from the horn antenna, the impedance is an equivalent circuit to a line of which the inductivity is increased (a high-inductance line to shorten the long side of the opening).

In this way, in the connection portion where the slit and the horn antenna are directly overlapped, the characteristic impedances of the slit and the horn antenna are adjusted in order to achieve a wide bandwidth of the frequency characteristic. However, there occurs a difference in size of the opening since the dielectric mediums are different from each other, and the shape of the metal conductor is different. Therefore, parasitic elements of capacitance and inductance components are generated. The parasitic element caused by a shape difference of the metal conductor is necessarily handled in a lumped constant manner without depending on the frequency.

An object of the invention is to provide a technology to achieve a wide bandwidth of a transmission line without using a frequency-dependent line in a propagation path.

Other objects and novel characteristics besides the above description of the invention will be apparent through the description and the accompanying drawings of this specification.

Solution to Problem

In the invention disclosed in this application, representative outlines will be simply described as follows.

A millimeter-wave antenna according to an embodiment includes a slit which is provided in a first metal conductor formed in a first surface of a circuit board, a horn antenna which is provided with a first opening and a second opening, and an impedance matching device which is provided in a slot shape between the slit and the first opening of the horn antenna.

A millimeter-wave sensor according to an embodiment is provided with at least one electric circuit among an RF circuit, an ADC/DAC, a DSP, and a power source circuit on a circuit board, transmits/receives an electric signal generated by the RF circuit using a horn antenna through a slit provided in a metal conductor of the circuit board and an impedance matching device, and serves as a sensor which calculates a speed component in the electric circuit based on a Doppler frequency detected from a difference in a transmitting and receiving signal.

Advantageous Effects of Invention

Making an explanation simply about an effect obtained by the representative outline in the invention disclosed in this application, the following effect is obtained.

According to an embodiment, it is possible to achieve a wide bandwidth of the transmission line without using the frequency-dependent line in the propagation path.

BRIEF DESCRIPTION OF DRAWINGS

FIG. 1 is a perspective view illustrating a millimeter-wave antenna of a first example in a first embodiment of the invention.

FIG. 2 is a cross-sectional view of the millimeter-wave antenna taken along line A-A' of FIG. 1.

FIG. 3 is an exploded view of the millimeter-wave antenna of FIG. 1.

FIG. 4 is an equivalent circuit diagram of the millimeter-wave antenna of FIG. 1.

FIG. 5 is a cross-sectional view illustrating a millimeter-wave antenna of a second example in the first embodiment of the invention.

FIG. 6 is a cross-sectional view illustrating a millimeter-wave antenna of a third example in the first embodiment of the invention.

FIG. 7 is a cross-sectional view illustrating a millimeter-wave antenna of a fourth example in the first embodiment of the invention.

FIG. 8 is a perspective view illustrating a slot which is formed in the millimeter-wave antenna of FIG. 7.

FIG. 9 is a perspective view illustrating a millimeter-wave antenna of a first example in a second embodiment of the invention.

FIG. 10 is a cross-sectional view of the millimeter-wave antenna taken along line A-A' of FIG. 9.

FIG. 11 is a perspective view illustrating a millimeter-wave antenna of a second example in the second embodiment of the invention.

FIG. 12 is a perspective view illustrating a millimeter-wave antenna of a first example in a third embodiment of the invention.

FIG. 13 is an exploded view of the millimeter-wave antenna of FIG. 12.

FIG. 14 is a cross-sectional view illustrating a millimeter-wave antenna of a second example in the third embodiment of the invention.

FIG. 15 is a perspective view illustrating a slot which is formed in the millimeter-wave antenna of FIG. 14.

FIG. 16 is a cross-sectional view illustrating a millimeter-wave antenna of a first example in a fourth embodiment of the invention.

FIG. 17 is a cross-sectional view illustrating a millimeter-wave antenna of a second example in the fourth embodiment of the invention.

FIG. 18 is a perspective view illustrating a millimeter-wave sensor of a first example in a fifth embodiment of the invention.

FIG. 19 is a circuit diagram of the millimeter-wave sensor of FIG. 18.

FIG. 20 is a perspective view illustrating a millimeter-wave sensor of a second example in the fifth embodiment of the invention.

FIG. 21 is a cross-sectional view illustrating a millimeter-wave antenna in the related art with respect to the embodiment of the invention.

FIG. 22 is an equivalent circuit diagram of the millimeter-wave antenna of FIG. 21.

DESCRIPTION OF EMBODIMENTS

In the following embodiments, the description will be divided into several sections or modes as needed for convenience sake. These sections or modes are related to each other except if otherwise specified, and one section or mode is related to modifications, details, and amendments of some or all of the other.

In addition, in a case where there is a mention about the number of elements (including numbers, numerical values, amounts, and ranges) in the following embodiments, the invention is not limited to the specific number except if otherwise specified and if the number is apparently specified in principle. The number may be equal to or more than the specific number, or may be equal to or less.

Further, it is a matter of course that the components (including element steps) in the following embodiments are not necessarily essential except if specified otherwise and if the components are apparently considered as essential in principle.

Similarly, when shapes and positional relations of the components are mentioned in the following embodiments, those substantially approximated or similar to the shapes are also included except if specified otherwise and if the shapes and positional relations are apparently considered to be different in principle. These principles are the same even as the numerical values and the ranges.

In addition, in all the drawings for describing the embodiments, the same members are attached with the same reference numeral in principle, and the redundant description will be omitted. Further, there may be hatched even in a perspective view and an exploded view in order to help with understanding on the drawings. In addition, the hatching may be omitted even in a cross-sectional view. Furthermore, the hatching may be partially made or omitted in the respective drawings.

In addition, in the following embodiments, the explanation will be given through a comparison between the related art and the embodiments in order to help with understanding on the features of the invention. First, the related art will be described for the sake of comparison to the embodiments.

Related Art Compared to Embodiments

A millimeter-wave antenna according to the related art will be described with reference to FIG. 21 for the sake of comparison to the embodiments. FIG. 21 is a cross-sectional view illustrating the millimeter-wave antenna according to the related art with respect to the embodiment.

In FIG. 21, there are provided a slit 1, a circuit board 2, a microstrip line 3, a horn antenna 5, a GND (ground) conductor 6, and an interlayer via 7 which connects conductor between layers. The millimeter-wave antenna illustrated in FIG. 21 is a millimeter-wave antenna formed directly overlapping the slit 1 and the horn antenna 5, and generates a parasitic component due to a difference in shape of a metal conductor. In order to employ the horn antenna with ridge in the millimeter-wave band, there is a need to reduce the parasitic component which is generated due to a difference of the metal conductor of a transmission line conversion unit. A wavelength in a free space in a band of 76 GHz is about 4 mm. In order to suppress a phase difference caused by the parasitic component to be equal to or less than 10 degrees, there is a need to make a difference of the metal conductor equal to or less than 0.1 mm which is 1/36 of the wavelength. Such a difference is almost the same as a minimum dimension at the time of processing the metal for mass production, and thus there is needed an unrealistic cost for mass production.

Further, the slit provided in the circuit board filled with the dielectric of a dielectric constant er is made such that a release hole provided in the metal conductor is made small in size in order to generate a wavelength compression of $1/\sqrt{er}$. When these lines are connected to the horn antenna with ridge, a difference of a conductor shape is increased, and the parasitic component is increased. Therefore, since the structure of the connection portion is necessarily reduced in size further, the millimeter-wave antenna in which the slit and the horn antenna are directly connected is not possible to be realized in a matching method of corresponding to the mass production cost.

Thus, in this embodiment, the problems of the related art have been studied. A technical idea in this embodiment obtained by the studying is to widen a bandwidth of a transmission line by not using a frequency-dependent line in a propagation path. In other words, the technical idea is to provide a bandwidth-widen antenna and a sensor using the antenna without using a λ/2 resonant antenna or a λ/4 matching device in which the bandwidth is restricted.

In order to realize the technical idea in this embodiment, a slot with a dielectric is provided between the slit which is a radiating element and the horn antenna. The slot is formed in a square column shape, and has a rectangular shape (an oblong shape) in cross-sectional view. An aspect ratio of the rectangular shape is formed such that the length in the longitudinal direction (magnetic field direction) is sufficiently longer than the slit in order to increase a capacitive performance. Alternatively, the slot is a slot shape of a concave cylinder (a concave cylindrical shape), and has a concave shape in cross-sectional view. The aspect ratio of the concave shape is formed such that the length in the longitudinal direction (magnetic field direction) is sufficiently longer than the slit in order to increase the capacitive performance. In addition, the capacitance is effectively increased even by filling the slot with the dielectric having a large dielectric constant. In addition, when the long side of the slot is formed longer than the long side of an opening of the horn antenna, the effect of the capacitive performance can be achieved even between a conductor surface where the slit is formed and the metal conductor of the horn antenna. In addition, the length of the slot in a propagation direction is set to be less than ¼ of the uppermost wavelength in a use frequency band showing a lumped constant behavior in order to cause an effective function as a capacitive element.

As an effect obtained from the above configuration, an impedance matching device serving as a π-type LC circuit illustrated in FIG. 4 is formed by the components such as the conductor surface forming the slit, the slot with the dielectric, and the metal conductor of the horn antenna. With this configuration, a capacitive component is added to cancel an inductive high impedance illustrated in FIG. 22. Therefore, it is possible to offset the dimensions of the slit and the horn antenna such that a characteristic impedance of the impedance matching device approaches a voltage standing wave ratio VSWR=1 which is an index for determination. Therefore, it is possible to realize a low-loss antenna of the millimeter-wave band in which a reflection characteristic between the transmission lines is improved, and a sensor which uses the low-loss antenna without sacrificing a broadband performance of the slit and the horn antenna.

In the following, the technical idea in this embodiment, the configurations to realize the technical idea, and the effects of the configuration will be described with reference to the drawings.

First Embodiment

The millimeter-wave antenna in the first embodiment will be described with reference to FIGS. 1 to 8.

First Example in First Embodiment

FIG. 1 is a perspective view illustrating the millimeter-wave antenna of a first example in the first embodiment. FIG. 2 is a cross-sectional view of the millimeter-wave antenna taken along line A-A' of FIG. 1. FIG. 3 is an exploded view of the millimeter-wave antenna of FIG. 1. In FIGS. 1 to 3, there are provided the slit 1, the circuit board 2, the microstrip line 3, the slot 4, the horn antenna 5, the GND (ground) conductor 6, and the interlayer via 7 which connects conductor between layers. In the millimeter-wave antenna, the electric field direction, the magnetic field direction, and the propagation direction are the same as those illustrated in FIG. 1. The electric field direction indicates a direction from a left upper side to a right lower side in FIG. 1. The magnetic field direction indicates a direction perpendicular to the electric field direction (a direction from a right upper side to a left lower side in FIG. 1) The propagation direction indicates a direction perpendicular to the electric field direction and the magnetic field direction (a direction from the upper side to the lower side in FIG. 1).

In the millimeter-wave antenna, the microstrip line 3 is formed in the upper surface of the circuit board 2. The GND conductor 6 is formed in the lower surface of the circuit board 2. The GND conductor 6 serves as a GND electrode of the microstrip line 3. The circuit board 2 is a multilayered board in which the metal conductors of the microstrip line 3 and the GND conductor 6 and the dielectric formed between the metal conductors are multi-layered. The terminal of the microstrip line 3 is formed over the slit 1, and connected to the GND conductor 6 through the interlayer via 7. The slit 1 is a rectangular release hole which is provided in the GND conductor 6. The rectangular release hole is formed in an oblong shape, and the magnetic field direction is a long side, and the electric field direction is a short side. An electromagnetic wave between the microstrip line 3 and the GND conductor 6 propagates in a TEM mode, and radiated as an electric wave of a TE01 mode by being applied between the long sides of the slit 1. In a use bandwidth of the electromagnetic wave passing through the millimeter-wave antenna, a frequency lower limit is set to f1, and a frequency upper limit is set to f2. The long side of the release hole becomes equal to or more than a length of $\lambda 1/(2\sqrt{e1})$ obtained by compressing the wavelength by a dielectric constant e1 of the circuit board 2 so as to make a cut-off frequency of the slit 1 become f1 or less.

The horn antenna 5 radiates the electric waves of the TE01 mode radiated from the slit 1 to a space. The horn antenna 5 includes a radiation opening 5-2 of a desired rectangular opening area (an oblong shape; the magnetization direction is a long side, and the electric field direction is a short side) which is used to define an antenna gain and a radiation direction. The horn antenna 5 is formed in a taper shape of a waveguide pipe which is formed of the conductor surface. A signal input portion of the horn antenna 5 near the slit 1 is formed in a waveguide pipe shape having a rectangular opening 5-1 (an oblong shape; the magnetization direction is a long side, and the electric field direction is a short side). The long side becomes a guide wavelength of $\lambda ½$ or more obtained by the wavelength compression $\sqrt{1}$ (dielectric constant 1) because of radiating to a space.

The slit 1 provided in the circuit board 2 and the length of the long side of the rectangular horn antenna 5 cause a relative ratio of $\sqrt{e1}$ times the dielectric interposed therebetween. In a case where the dielectric used in the circuit board 2 is a glass epoxy resin of the dielectric constant 4, the relative ratio of the length of the long side of the conductor becomes large by two times or so. In the millimeter-wave antenna in which the slit 1 and the horn antenna 5 of the related art illustrated in FIG. 21 are directly connected, in a case where the slit 1 and the horn antenna 5 different in size of the long side of the conductor abut, the horn antenna 5 viewed from the slit 1 is handled as a low-impedance transmission line, and the slit 1 viewed from the horn antenna 5 is handled as a high-impedance transmission line. An equivalent circuit of a discontinuous surface of the conductor is illustrated in FIG. 22.

FIG. 22 is an equivalent circuit diagram of the millimeter-wave antenna of FIG. 21. In FIG. 22, a parasitic inductance 31 and a parasitic capacitance 32 are generated between the slit 1 and the horn antenna 5. The parasitic inductance 31 is generated between the slit 1 and the horn antenna 5. The parasitic capacitance 32 is generated with respect to the GND potential on a side near the slit 1.

With this regard, in the millimeter-wave antenna illustrated in FIGS. 1 to 3, the slot 4 is disposed between the slit 1 and the horn antenna 5. The slot 4 is a slot shape of a square column. The slot 4 is added to the millimeter-wave antenna, and becomes the equivalent circuit as illustrated in FIG. 4. FIG. 4 is an equivalent circuit diagram of the millimeter-wave antenna illustrated in FIGS. 1 to 3. As illustrated in the equivalent circuit of FIG. 4, the parasitic inductance 31, the parasitic capacitance 32, and a capacitance component of the slot 4 form a π-type equivalent circuit. The high impedance caused by the parasitic inductance is cancelled by the capacitance component of the slot 4. The voltage standing wave ratio between lines is suppressed by making the impedance of the equivalent circuit approach a characteristic impedance of the transmission line of the slit 1 and the horn antenna 5. In other words, the characteristic impedance is set to approach the voltage standing wave ratio VSWR=1 which is an index for determination.

The length of the slot 4 in the propagation direction is desirably set such that a rotation amount of the transmission phase of the slot 4 becomes less than 90° (with respect to a wavelength $\lambda 2$ of the frequency upper limit f2 of the millimeter-wave antenna) in order to handle the equivalent circuit illustrated in FIG. 4 as a lumped constant circuit. In other words, a length L3 of the slot 4 in the propagation direction illustrated in FIG. 3 is less than ¼ of the wavelength $\lambda 2$ of the used frequency upper limit f2. In addition, the slot 4 illustrated in FIGS. 1 to 3 can be increased in the capacitance component by being provided larger than the inner surface of the conductor of the signal input portion of the horn antenna 5. In particular, the capacitance component can be more effectively increased by widening the size in the slot 4 in the magnetization direction. In other words, a length L1 of the slot 4 in the magnetization direction illustrated in FIG. 3 is longer than a length L11 of the opening 5-1 of the horn antenna 5 in the magnetization direction. In addition, in the example of the slot 4 illustrated in FIG. 3, a length L2 of the slot 4 in the electric field direction also becomes longer than a length L12 of the opening 5-1 of the horn antenna 5 in the electric field direction. In addition, the length of the slot 4 in the electric field direction is desirably set to be equal to or less than the length of the short side of the slit 1 in order to increase the capacitance component. Further, when the slot 4 is filled with the dielectric of a dielectric constant e2, the capacitance component can be increased two times. The value of the capacitance component in the slot 4 is a correction coefficient with respect to a parasitic element, and is a design variation to optimize the size of the rectangular shape in cross-sectional view, the length (the propagation direction), and the dielectric constant e2 in the slot shape (a square column) of the slot 4.

In a transmission path designed such that the slit 1 and the signal input portion of the horn antenna 5 become a specific characteristic impedance, the difference in characteristic impedance becomes small as well as the discontinuous portion of the conductor in cross-sectional view if the slit 1 and the horn antenna 5 are connected through the slot 4 filled with the dielectric of the dielectric constant e2. It is possible to suppress the voltage standing wave ratio between the transmission paths. Therefore, when the slot 4 is used as the impedance matching device between the slit 1 and the horn antenna 5, the use bandwidth can be widened in the millimeter-wave antenna equipped with the circuit board 2.

Second Example in First Embodiment

FIG. 5 is a cross-sectional view illustrating the millimeter-wave antenna of a second example in the first embodiment. In FIG. 5, there are provided the slit 1, the circuit board 2, the microstrip line 3, the slot 4, the horn antenna 5, the GND conductor 6, the interlayer via 7 which connects conductor between layers, and a casing 8. In this example, the description will be mainly given about differences from the above example.

The millimeter-wave antenna illustrated in FIG. 5 is provided with the release hole of the slot shape in the casing 8, and forms the slot 4 which is filled with the dielectric of the dielectric constant e2. In the circuit board 2, a semiconductor part and a passive component to realize a desired circuit operation, and circuit components such as a connector are mounted. In a case where a board temperature varies due to heating or operation circumstances in the circuit board 2, some or all of the circuit board 2 are expanded and bent. Deviation in position and separation due to thermal stress of the slot 4 are suppressed by fixing the circuit board 2 and the horn antenna 5 to the casing 8. Therefore, it is possible to form the millimeter-wave antenna which is mechanically stable.

Third Example in First Embodiment

FIG. 6 is a cross-sectional view illustrating the millimeter-wave antenna of a third example in the first embodiment. In FIG. 6, there are provided the slit 1, the circuit board 2, the microstrip line 3, the slot 4, the horn antenna 5, the GND conductor 6, and the interlayer via 7 which connects conductor between layers. In this example, the description will be mainly given about differences from the above example.

The millimeter-wave antenna illustrated in FIG. 6 is formed such that the casing 8 illustrated in FIG. 5 is integrated with the horn antenna 5, the release hole of the slot shape is provided in the signal input portion of the horn antenna 5, and the slot 4 is filled with the dielectric of the dielectric constant e2. Deviation in position and separation of the slot 4 are suppressed by fixing the circuit board 2 to the horn antenna 5. Therefore, it is possible to form the millimeter-wave antenna which is mechanically stable.

Fourth Example in First Embodiment

FIG. 7 is a cross-sectional view illustrating the millimeter-wave antenna of a fourth example in the first embodiment. In FIG. 7, there are the slit 1, the circuit board 2, the microstrip line 3, the slot 4, the horn antenna 5, GND conductors 6-1 and 6-2, and the interlayer via 7 which connects conductor between layers. In this example, the description will be mainly given about differences from the above example.

In the millimeter-wave antenna illustrated in FIG. 7, the circuit board 2 is formed as a multilayered board obtained by stacking a dielectric layer of the dielectric constant e1 (on a side near the microstrip line 3) and the dielectric layer of the dielectric constant e2 (on a side near the horn antenna 5). The interlayer vias 7 are arranged in a rectangular shape in the dielectric layer of the dielectric constant e2 in order to simulate the slot 4.

FIG. 8 is a perspective view illustrating the slot 4 which is formed using the interlayer via 7 in the dielectric layer of the dielectric constant e2 of the circuit board 2. The GND conductor 6 is formed of the GND conductor 6-1 which forms the slit 1 and the GND conductor 6-2 which abuts on the signal input portion of the horn antenna 5. The GND conductors 6-1 and 6-2 are connected by the interlayer vias 7 which equalize the potential. The interlayer vias 7 (hereinafter, referred to as "via array 9") arranged in a rectangular shape are disposed on the outer side from the release hole of the slit 1. Therefore, the dielectric layer of the dielectric constant e2 on the inner side of the via array 9 is realized to have the same function as the slot 4 illustrated in FIG. 1. The thickness of the dielectric layer of the dielectric constant e2 becomes the length (the propagation direction) of the slot 4. A distance of the inner surface of the via array 9 is equivalent to the size of the rectangular shape in cross-sectional view of the slot 4. A layer thickness of the dielectric layer of the dielectric constant e2, and a longitudinal/horizontal size of the distance of the inner surface of the via array 9 becomes a design variation of the value of the capacitance component illustrating the equivalent circuit of FIG. 4. In addition, an opening size of the slit 1 provided in the GND conductor 6-1, and an opening size of the signal input portion of the horn antenna 5 both are changed in capacitance value due to a relative difference from the via array 9. Therefore, it is possible to use an opening size of the slit 1 as an optimized design variation.

Second Embodiment

The millimeter-wave antenna in the second embodiment will be described with reference to FIGS. 9 to 11.

First Example in Second Embodiment

FIG. 9 is a perspective view illustrating the millimeter-wave antenna of a first example in the second embodiment. FIG. 10 is a cross-sectional view of the millimeter-wave antenna taken along line A-A' of FIG. 9. In FIGS. 9 and 10, there are provided the slit 1, the circuit board 2, a pseudo-waveguide line 11, the slot 4, the horn antenna 5, the GND conductors 6-1 and 6-3, and the interlayer via 7 which connects conductor between layers. In this example, the description will be mainly given about differences from the above example.

In the millimeter-wave antenna illustrated in FIGS. 9 and 10, the pseudo-waveguide line 11 is formed in the circuit board 2, and is a waveguide line which defines the cut-off frequency by a distance d between the interlayer vias 7 disposed in the magnetization direction of the propagation direction with respect to the electromagnetic wave propagated between the GND conductors 6-3 and 6-1 formed in the upper and lower conductor surface of the circuit board 2 connected by the interlayer via 7. The slit 1 is a rectangular release hole which is provided in the GND conductor 6-1 on the lower surface side of the circuit board 2. A long side of the release hole of the slit 1, and a distance between vias of the pseudo-waveguide line 11 is set to a length of $\lambda 1/(2\sqrt{e1})$ or more obtained by compressing the wavelength more than the dielectric constant e1 of the circuit board 2 so as to make the cut-off frequency equal to or less than f1.

The horn antenna 5 includes the radiation opening 5-2 formed by an opening area of a desired rectangular shape in order to define an antenna gain and a radiation direction. The horn antenna has a taper shape by the waveguide pipe which is formed of the conductor surface. The signal input portion of the horn antenna 5 near to the slit 1 is a waveguide pipe shape having the rectangular opening 5-1. The long side serves as an antenna for the radiation to the space, and thus becomes a length equal to or more than the guide wavelength of $\lambda \frac{1}{2}$ obtained by the wavelength compression $\sqrt{1}$ (dielectric constant 1). When the characteristic impedance is adjusted to suppress a reflection characteristic of a connection portion between the pseudo-waveguide line 11 and the slit 1, the short side of the slit 1 and the thickness of the dielectric of the dielectric constant e1 become inevitably approximate since both are defined by the dielectric of the dielectric constant e1. Even in the millimeter-wave antenna using the pseudo-waveguide line 11 illustrated in FIGS. 9 and 10, the slit 1 provided in the circuit board 2 and the length of the long side of the rectangular horn antenna 5 cause a relative ratio of $\sqrt{e1}$ times the dielectric interposed therebetween. Therefore, the discontinuous surface of the conductor becomes the equivalent circuit as illustrated in FIG. 22.

However, in the millimeter-wave antenna illustrated in FIGS. 9 and 10, the slot 4 is disposed between the slit 1 and the horn antenna 5. The slot 4 is added to the millimeter-wave antenna, and a π-type equivalent circuit is formed by the parasitic inductance 31, the parasitic capacitance 32, and the capacitance component generated by the slot 4 as illustrated in the equivalent circuit of FIG. 4. The high impedance caused by the parasitic inductance is cancelled by the capacitance component of the slot 4. The voltage standing wave ratio between lines is suppressed by making the impedance of the equivalent circuit approach a characteristic impedance of the transmission line of the slit 1 and the horn antenna 5.

The length of the slot 4 in the propagation direction is desirably set such that a rotation amount of the transmission phase of the slot 4 becomes less than 90° in order to handle the equivalent circuit illustrated in FIG. 4 as a lumped constant circuit. In addition, the slot 4 illustrated in FIGS. 9 and 10 can be increased in the capacitance component by being provided larger than the inner surface of the conductor of the signal input portion of the horn antenna 5. In particular, the capacitance component can be more effectively increased by widening the size in the slot 4 in the magnetization direction. In addition, the length of the slot 4 in the electric field direction is desirably set to be equal to or less than the length of the short side of the slit 1 in order to increase the capacitance component. Further, when the slot 4 is filled with the dielectric of a dielectric constant e2, the capacitance component can be increased two times. The value of the capacitance component in the slot 4 is a correction coefficient with respect to a parasitic element, and is a design variation to optimize the size of the rectangular shape in cross-sectional view, the length (the propagation direction), and the dielectric constant e2 in the slot shape (a square column) of the slot 4.

In a transmission path designed such that the slit 1 and the signal input portion of the horn antenna 5 become a specific characteristic impedance, the difference in characteristic impedance becomes small as well as the discontinuous portion of the conductor in cross-sectional view if the slit 1 and the horn antenna 5 are connected through the slot 4 filled with the dielectric of the dielectric constant e2. It is possible to suppress the voltage standing wave ratio between the transmission paths. Further, the use bandwidth can be widened in the millimeter-wave antenna equipped with the circuit board 2.

Second Example in Second Embodiment

FIG. 11 is a perspective view illustrating the millimeter-wave antenna of a second example in the second embodiment. In FIG. 11, there is provided the slit 1, the circuit board 2, a coplanar line 12 with ground, the slot 4, the horn antenna 5, the GND conductors 6-1 and 6-3, and the interlayer via 7 which connects conductor between layers. In this example, the description will be mainly given about differences from the above example.

In the millimeter-wave antenna illustrated in FIG. 11, the coplanar line 12 with ground is formed in the upper surface of the circuit board 2. The GND conductor 6-1 is formed in the lower surface of the circuit board 2. The GND conductor 6-1 serves as a GND electrode of the coplanar line 12 with ground. The terminal of the coplanar line 12 with ground is connected to the GND conductor 6-1 of the lower surface of the circuit board 2 and the GND conductor 6-3 of the upper surface of the circuit board 2 connected by the interlayer via 7. The slit 1 is a rectangular release hole which is provided in the GND conductor 6-1. The electromagnetic wave between the coplanar line 12 with ground and the GND conductor 6-1 is propagated mainly in the TEM mode. However, when being added between the long sides of the slit 1, the electromagnetic wave is radiated as the electromagnetic wave of the TE01 mode. In the use bandwidth of the electromagnetic wave passing through the millimeter-wave antenna, the long side of the release hole is set to a length of $\lambda 1/(2\sqrt{e1})$ or more obtained by compressing the wavelength more than the dielectric constant e1 of the circuit board 2 so as to make the cut-off frequency of the slit 1 equal to or less than f1.

Even in the millimeter-wave antenna using the coplanar line 12 with ground of FIG. 11, the slot 4 is disposed between the slit 1 and the horn antenna 5. The slot 4 is added to the millimeter-wave antenna, and a π-type equivalent circuit is formed by the parasitic inductance 31, the parasitic capacitance 32, and the capacitance component generated by the slot 4 as illustrated in the equivalent circuit of FIG. 4.

In a transmission path designed such that the slit 1 and the signal input portion of the horn antenna 5 become a specific characteristic impedance, the difference in characteristic impedance becomes small as well as the discontinuous portion of the conductor in cross-sectional view if the slit 1 and the horn antenna 5 are connected through the slot 4 filled with the dielectric of the dielectric constant e2. It is possible to suppress the voltage standing wave ratio between the transmission paths. Further, the use bandwidth can be widened in the millimeter-wave antenna equipped with the circuit board 2.

Third Embodiment

The millimeter-wave antenna in the third embodiment will be described with reference to FIGS. 12 to 15.

First Example of Third Embodiment

FIG. 12 is a perspective view illustrating the millimeter-wave antenna of a first example in the third embodiment. FIG. 13 is an exploded view of the millimeter-wave antenna of FIG. 12. In FIGS. 12 and 13, there are provided the slit 1, the circuit board 2, the microstrip line 3, the slot 4, the horn antenna 5, the GND conductor 6, and the interlayer via 7 which connects conductor between layers. In this example, the description will be mainly given about differences from the above example.

In the millimeter-wave antenna illustrated in FIGS. 12 and 13, the microstrip line 3 is formed in the upper surface of the circuit board 2. The GND conductor 6 is formed in the lower surface of the circuit board 2. The GND conductor 6 serves as the GND electrode of the microstrip line 3. The terminal of the microstrip line 3 is formed over the slit 1, and connected to the GND conductor 6 through the interlayer via 7. The slit 1 is a concave release hole which is provided in the GND conductor 6. An electromagnetic wave between the microstrip line 3 and the GND conductor 6 propagates in a TEM mode, and radiated as an electric wave of a TE01 mode by being applied between the long sides s of the slit 1. In a use bandwidth of the electromagnetic wave passing through the millimeter-wave antenna, a frequency lower limit is set to f1, and a frequency upper limit is set to f2. The long side of the release hole becomes equal to or more than a length of $\lambda 1/(2\sqrt{e1})$ obtained by compressing the wavelength by a dielectric constant e1 of the circuit board 2 so as to make a cut-off frequency of the slit 1 become f1 or less. In a case where a characteristic impedance of the microstrip line 3 provided on the circuit board 2 is 50Ω, the characteristic impedance can be effectively lowered while keeping the cut-off frequency of the slit 1 by making the shape of the release hole of the slit 1 in a concave shape.

The horn antenna 5 includes the radiation opening 5-2 of a desired concave opening area which is used to define an antenna gain and a radiation direction. The horn antenna 5 is formed in a taper shape of a waveguide pipe which is formed of the conductor surface. A signal input portion of the horn antenna 5 near the slit 1 is formed in a waveguide pipe shape having the concave opening 5-1. The long side becomes a guide wavelength of $\lambda \frac{1}{2}$ or more obtained by the wavelength compression $\lambda 1$ (dielectric constant 1) because of radiating to a space. The characteristic impedance can be effectively lowered while keeping the cut-off frequency by processing the signal input portion of the horn antenna 5 also in the concave ridge structure 5-3. In matching with a space impedance of the air, a ridge-shaped projection is gradually shortened in the waveguide pipe which is processed in taper shape to be approached to the inner surface of the waveguide pipe so as to change the impedance in the horn antenna 5. The horn antenna 5 is necessarily provided with a finite opening area to obtain a desired radiation directivity. Further, the length itself of the horn antenna 5 is long as much as five times the wavelength of $\lambda 1$ or more. Therefore, even if the ridge-shaped projection is provided, the length of the horn antenna 5 does not extend.

Even in the millimeter-wave antenna illustrated in FIGS. 12 and 13, the slit 1 provided in the circuit board 2 and the length of the long side of the concave shape of the horn antenna 5 cause a relative ratio of $\sqrt{e1}$ times the dielectric interposed therebetween. Therefore, in a case where the slit 1 and the horn antenna 5 different in size of the long side of the conductor abut, the horn antenna 5 viewed from the slit 1 is handled as a low-impedance transmission line, and the slit 1 viewed from the horn antenna 5 is handled as a high-impedance transmission line. An equivalent circuit of a discontinuous surface of the conductor is illustrated in FIG. 22. The parasitic inductance 31 and the parasitic capacitance 32 are generated between the slit 1 and the horn antenna 5. The parasitic inductance 31 is generated between the slit 1 and the horn antenna 5. The parasitic capacitance 32 is generated with respect to the GND potential on a side near the slit 1.

However, in the millimeter-wave antenna illustrated in FIGS. 12 and 13, the slot 4 is added between the slit 1 and the horn antenna 5 as illustrated in the equivalent circuit of FIG. 4, so that the parasitic inductance 31, the parasitic capacitance 32, and the capacitance component of the slot 4 form a π-type equivalent circuit. The cross section of the slot 4 in the propagation direction is also formed in a concave shape in order not to cause a steep change in radio wave intensity. In other words, the slot 4 is in a shot shape of a concave cylinder (a concave cylindrical shape), and the cross section is in a concave shape. The high impedance caused by the parasitic inductance is cancelled by the capacitance component of the slot 4. The voltage standing wave ratio between lines is suppressed by making the impedance of the equivalent circuit approach a characteristic impedance of the transmission line of the concave slit 1 and the horn antenna 5 with ridge.

The length of the slot 4 in the propagation direction is desirably set such that a rotation amount of the transmission phase of the slot 4 becomes less than 90° (with respect to a wavelength $\lambda 2$ of the frequency upper limit f2 of the millimeter-wave antenna) in order to handle the equivalent circuit illustrated in FIG. 4 as a lumped constant circuit. In addition, the size of the slot 4 illustrated in FIGS. 12 and 13 is provided larger than the inner surface of the conductor of the signal input portion of the horn antenna 5. Therefore, it is possible to increase the capacitance component. In particular, the capacitance component can be more effectively increased by widening the size in the slot 4 in the magnetization direction. In addition, the length of the slot 4 in the electric field direction is desirably set to be equal to or less than the length of the short side of the slit 1 in order to increase the capacitance component. Further, when the slot 4 is filled with the dielectric of the dielectric constant e2, the capacitance component of the equivalent circuit of FIG. 4 can be realized by the capacitance increasing effect of the dielectric constant e2. The concave projection of the slot 4 can be made shorter than the length of the concave projection of the slit 1. The value of the capacitance component in the slot 4 is a correction coefficient with respect to a parasitic element. The value is a design variation to optimize the size of the concave shape of the slot 4 in cross-sectional view, the length in the propagation direction of the radio wave, the length and the width of the concave projection, and the dielectric constant e2.

In a transmission path designed such that the slit 1 and the signal input portion of the horn antenna 5 become a specific characteristic impedance, the difference in characteristic impedance becomes small as well as the discontinuous portion of the conductor in cross-sectional view if the slit 1 and the horn antenna 5 are connected through the concave slot 4 filled with the dielectric of the dielectric constant e2. It is possible to suppress the voltage standing wave ratio between the transmission paths. The use bandwidth can be widened in the millimeter-wave antenna equipped with the circuit board 2.

Second Example in Third Embodiment

FIG. 14 is a cross-sectional view illustrating the millimeter-wave antenna of a second example in the third embodiment. In FIG. 14, there are provided the slit 1, the circuit board 2, the microstrip line 3, the slot 4, the horn antenna 5, the GND conductors 6-1 and 6-2, and the interlayer via 7 which connects conductor between layers. In this example, the description will be mainly given about differences from the above example.

In the millimeter-wave antenna illustrated in FIG. 14, the circuit board 2 is formed as a multilayered board obtained by stacking the dielectric layer of the dielectric constant e1 and the dielectric layer of the dielectric constant e2. The interlayer vias 7 are arranged in a rectangular shape in the dielectric layer of the dielectric constant e2 in order to simulate the slot 4. The slit 1, the slot 4, and the conductor of the signal input portion of the horn antenna 5 are formed in a concave shape.

FIG. 15 is a perspective view illustrating the slot 4 which includes a concave release hole formed using the interlayer via 7 in the dielectric layer of the dielectric constant e2 of the circuit board 2. The GND conductor 6 is formed of the GND conductor 6-1 which forms the slit 1 and the GND conductor 6-2 which abuts on the signal input portion of the horn antenna 5. The GND conductors 6-1 and 6-2 are connected by the interlayer vias 7 which equalize the potential. The interlayer vias 7 (the via array 9) arranged in a concave shape are disposed on the outer side from the release hole of the slit 1. Therefore, the dielectric layer of the dielectric constant e2 on the inner side of the via array 9 is realized to have the same function as the slot 4 illustrated in FIG. 1. The thickness of the dielectric layer of the dielectric constant e2 becomes the length of the slot 4. A distance of the inner surface of the via array 9 is equivalent to the size of the concave shape in cross-sectional view of the slot 4. A layer thickness of the dielectric layer of the dielectric constant e2, and a longitudinal/horizontal size of the distance of the inner surface of the via array 9 becomes a design variation of the value of the capacitance component illustrating the equivalent circuit of FIG. 4. In addition, an opening size of the slit 1 provided in the GND conductor 6-1, and an opening size of the signal input portion of the horn antenna 5 both are changed in capacitance value due to a relative difference from the via array 9. Therefore, it is possible to use an opening size of the slit 1 as an optimized design variation.

Fourth Embodiment

The millimeter-wave antenna in the fourth embodiment will be described with reference to FIGS. 16 and 17.

First Example in Fourth Embodiment

FIG. 16 is a cross-sectional view illustrating the millimeter-wave antenna of a first example in the fourth embodiment. In FIG. 16, there are provided the slit 1, the circuit board 2, the microstrip line 3, the slot 4, the horn antenna 5, the GND conductors 6-1 and 6-2, the interlayer via 7 which connects conductor between layers, and a dielectric lens 10. In this example, the description will be mainly given about differences from the above example.

The millimeter-wave antenna illustrated in FIG. 16 is an example in which the dielectric lens 10 is added to the millimeter-wave antenna illustrated in FIGS. 14 and 15. This embodiment is not limited to the configuration, and may be applied to millimeter-wave antennas other than that illustrated in FIGS. 1 to 13.

In the millimeter-wave antenna illustrated in FIG. 16, the circuit board 2 is formed as a multilayered board obtained by stacking the dielectric layer of the dielectric constant e1 and the dielectric layer of the dielectric constant e2. The interlayer vias 7 are arranged in a rectangular shape in the dielectric layer of the dielectric constant e2 in order to simulate the slot 4. The slit 1, the slot 4, and the conductor of the signal input portion of the horn antenna 5 are formed in a concave shape. The slot 4 includes the GND conductors 6-1 and 6-2 and the interlayer via 7 in the circuit board 2 as illustrated in FIGS. 14 and 15.

The dielectric lens 10 is a lens which is disposed in the radiation opening 5-2 of the horn antenna 5, and adjusts a phase in the propagation direction of the electromagnetic wave radially diffused in the horn antenna 5. According to a desired lens focal distance, a one-side convex lens, a both-side convex lens, or a one-side cylindrical lens is used. In FIG. 16, a one-side convex lens which is convex toward the signal input portion of the horn antenna 5 is used. A lens curvature and a lens focal distance can be adjusted by increasing the dielectric constant of a lens material. When a lens material having a high dielectric constant is used, the length of the horn antenna 5 can also be shortened.

Second Example of Fourth Embodiment

FIG. 17 is a cross-sectional view illustrating the millimeter-wave antenna of a second example of the fourth embodiment. The millimeter-wave antenna illustrated in FIG. 17 is a modification of the dielectric lens 10 of the millimeter-wave antenna illustrated in FIG. 16. In this example, the description will be mainly given about differences from the above example.

In the millimeter-wave antenna illustrated in FIG. 17, the dielectric lens 10 having a shape obtained by combining a one-side convex lens and a triangular prism (that is, a lens shape of which one side is formed as a convex lens and the other side is linearly increased in thickness to be a slope) is disposed in the radiation opening 5-2 of the horn antenna 5. When the dielectric lens 10 as illustrated in FIG. 17 is provided, the propagation direction of the electromagnetic wave (the radiation direction of the radio wave) can also be deflected according to a curvature index of the lens.

Fifth Embodiment

A millimeter-wave sensor in the fifth embodiment will be described with reference to FIGS. 18 to 20. The millimeter-wave sensor in the fifth embodiment is a sensor which uses the millimeter-wave antenna illustrated in the first to fourth embodiments.

First Example in Fifth Embodiment

FIG. 18 is a perspective view illustrating the millimeter-wave sensor of a first example in the fifth embodiment. In FIG. 18, there are provided the circuit board 2, the microstrip line 3, the horn antenna 5, a millimeter-band RF (Radio Frequency) circuit 21, an ADC (Analog/Digital Converter)/DAC (Digital/Analog Converter) 22, a DSP (Digital Signal Processing Unit) 23, a power source unit 24, and an input/output terminal 26. In the millimeter-wave sensor illustrated in FIG. 18, the circuit board 2, the microstrip line 3, and the horn antenna 5 are components of the millimeter-wave antenna illustrated in the first to fourth embodiments. The millimeter-wave sensor illustrated in FIG. 18 is an example where the millimeter-wave antenna illustrated in FIGS. 12 and 13 is used.

FIG. 19 is a circuit diagram of the millimeter-wave sensor of FIG. 18. In FIG. 19, there is provided a transceiver antenna 25 which corresponds to the millimeter-wave antenna illustrated in the first to fourth embodiments.

In the millimeter-wave sensor illustrated in FIGS. 18 and 19, for example, a millimeter-wave signal generated by a millimeter-band RF circuit 21 passes through the microstrip line 3 of the transceiver antenna 25, is radiated from the horn antenna 5, reaches a target object and is reflected thereon, and then is received by the horn antenna 5 again. A Doppler signal is contained in the received millimeter-wave signal due to a difference in relative speed. The Doppler signal is extracted by comparing the received wave and the transmitting wave in the millimeter-wave band RF circuit 21. The extracted Doppler signal is converted into a digital signal by the ADC of the ADC/DAC 22, and is Fourier-converted by the DSP 23. A Doppler frequency is detected and analyzed to calculate a relative operating condition of the object such as a relative speed.

In addition, a processing result of the DSP 23 can be output through the input/output terminal 26. In addition, the digital signal input through the input/output terminal 26 may be processed by the DSP 23, converted into an analog signal by the DAC of the ADC/DAC 22, and transmitted to the millimeter-wave band RF circuit 21.

Second Example in Fifth Embodiment

FIG. 20 is a perspective view illustrating the millimeter-wave sensor of a second example in the fifth embodiment. In FIG. 20, there are provided the circuit board 2, the microstrip line 3, the horn antenna 5, the millimeter-wave band RF circuit 21, the ADC/DAC 22, the DSP 23, the power source unit 24, the input/output terminal 26, and a lid 28 which covers the millimeter-wave band RF circuit 21. In this example, the description will be mainly given about differences from the above example.

In the millimeter-wave sensor illustrated in FIG. 20, a plurality of the horn antennas 5 are used (two in the example of FIG. 20), and the antennas for transmission and reception are separated for the purpose of reducing isolation between the transmission and the reception and of improving a dynamic range of a reception circuit. In addition, when two or more horn antennas 5 are provided for each of the transmission and the reception, the radiation (active beam scan) in the radiation direction can be realized by actively providing a phase difference between the plurality of antennas using the millimeter-wave band RF circuit 21. Further, when a plurality of the horn antennas 5 for the transmission and the reception are provided, and the dielectric lens is used to change the radiation direction illustrated in FIG. 17 to an arbitrary direction, a plurality of antenna beams having different radiation directions are realized.

Surface mounting components such as the millimeter-wave band RF circuit 21, the ADC/DAC 22, and the DSP 23 are mounted in the same board surface in order to reduce a mounting cost. The millimeter-wave signal has a short wavelength. Therefore, there occurs leakage of the millimeter-wave signal from the millimeter-wave band RF circuit 21 and the microstrip line 3 to the ADC/DAC 22 and the DSP 23, and thus an error in sensing occurs.

As a countermeasure, there is provided the lid 28 which covers the millimeter-wave band RF circuit 21 and the microstrip line 3. As illustrated in FIGS. 18 and 20, the millimeter-wave band RF circuit 21 and the microstrip line 3 are configured in the upper surface of the circuit board 2, and electrically separated from the horn antenna 5 and the GND conductor 6 in the circuit board 2. According to the structure of the millimeter-wave antenna in this embodiment, the millimeter-wave signal in the millimeter-wave sensor can be shielded in a closed space which is formed by the circuit board 2 and the lid 28. The lid 28 is formed of metal or a conductive resin such as carbon having a shield effect. Noises may be generated in the millimeter-wave band used for a spatial resonance according to a closed space size which is generated by the lid 28. As a countermeasure, a material such as carbon using a dielectric loss caused by a molecular polarization or a ferrate using a magnetic loss is used as a part of resin composition, and the lid 28 having a radio-wave absorption characteristic and a radio-shielding effect is used. Then, it is possible to realize a good productivity at a low cost due to an injection molding, and a reduction in weight due to a resin material.

Effects in First to Fifth Embodiments

According to the millimeter-wave antenna and the millimeter-wave sensor using the millimeter-wave antenna in the first to fifth embodiments, there is no use of a frequency-dependent line in the propagation path, so that the transmission line can be widened in bandwidth. In other words, it is possible to provide the bandwidth-widen antenna and the sensor using the antenna without using a $\lambda/2$ resonant antenna or a $\lambda/4$ matching device in which the bandwidth is restricted. The more detailed descriptions are as follows.

(1) The capacitive performance can be increased by providing the slot 4 with the dielectric between the slit 1 and the horn antenna 5.

(2) The slot 4 is filled with the dielectric having a large dielectric constant, so that the capacitance can be increased.

(3) The length of the slot 4 in the propagation direction is set to be less ¼ of the wavelength of the use frequency upper limit of the slot 4 in the propagation direction, so that an effective function as a capacitive element can be achieved, and a lumped constant behavior can be achieved.

(4) The long side of the rectangular shape or the concave shape of the slot 4 is formed longer than the long side of the opening of the horn antenna 5, so that the effect of the capacitive performance can be generated even between the conductor surface forming the slit 1 and the metal conductor surface of the horn antenna 5.

(5) The capacitive component of the slot 4 according to (1) to (4) is added to use the slot 4 as the impedance matching device between the slit 1 and the horn antenna 5, so that a combined impedance of a parasitic element caused by a different in shape of the metal conductor can be matched to a characteristic impedance of the slit 1 or the horn antenna 5. As a result, it is possible to realize a low-loss antenna of the millimeter-wave band in which a reflection characteristic between the transmission lines is improved, and a sensor which uses the low-loss antenna without sacrificing a broadband performance of the slit 1 and the horn antenna 5.

Hitherto, while having been described in detail based on the embodiments, the invention implemented by the inventor is not limited to these embodiments. It is a matter of course that various changes can be made in a scope not departing from the spirit.

For example, the embodiments are described in a clearly understandable way for the invention, and thus the invention is not necessarily to provide all the configurations described above. In addition, some configurations of a certain embodiment may be replaced with the configurations of another embodiment, and the configuration of the other embodiment may also be added to the configuration of a certain embodiment. Furthermore, additions, omissions, and substitutions may be made on some configurations of each embodiment using other configurations.

REFERENCE SIGNS LIST

1: slit
2: circuit board
3: microstrip line
4: slot
5: horn antenna
5-1: opening
5-2: radiation opening
5-3: ridge structure
6, 6-1, 6-2, 6-3: GND conductor
7: interlayer via
8: casing
9: via array
10: dielectric lens
11: pseudo-waveguide line
12: coplanar line with ground
21: millimeter-wave band RF circuit
22: ADC/DAC
23: DSP
24: power source unit
25: transceiver antenna
26: input/output terminal
28: lid

The invention claimed is:
1. A millimeter-wave antenna, comprising:
a slit which is provided in a first metal conductor formed in a first surface of a circuit board;
a horn antenna which is provided with a first opening and a second opening;

an impedance matching device which is provided in a slot shape between the slit and the first opening of the horn antenna.

2. The millimeter-wave antenna according to claim 1, wherein
the impedance matching device is formed in the slot shape which is filled with a dielectric having a dielectric constant different from that of the circuit board.

3. The millimeter-wave antenna according to claim 2, wherein
the impedance matching device is configured such that a size of a rectangular shape of the slot shape in a magnetic field direction is larger than that of the first opening of the horn antenna.

4. The millimeter-wave antenna according to claim 1, wherein
the impedance matching device is configured such that a length of the slot shape in a propagation direction is less than ¼ of a wavelength of an upper limit of a use frequency.

5. The millimeter-wave antenna according to claim 1, wherein
the circuit board is configured such that a microstrip line, a coplanar line with ground, or a waveguide line is formed in a second metal conductor formed in a second surface on an opposite side to the first surface of the circuit board, and is used as a transmission line to supply power to the slit.

6. The millimeter-wave antenna according to claim 1, wherein
the circuit board is a multilayered board in which the first metal conductor formed in the first surface of the circuit board, a second metal conductor formed in a second surface on an opposite side to the first surface of the circuit board, a dielectric formed between the first metal conductor and the second metal conductor are multi-layered,
the circuit board includes
a transmission line of the slit formed of the first metal conductor and a microstrip line formed of the second metal conductor, and
the slot shape which is formed by the first metal conductor, the second metal conductor, and an interlayer via which is connected between the metal conductors of the first metal conductor and the second metal conductor, and
the impedance matching device of the slot shape is built in the circuit board.

7. The millimeter-wave antenna according to claim 1, wherein
a shape of the slit, the slot shape of the impedance matching device, and a shape of the first opening of the horn antenna are a concave shape, and are matched to a transmission line of a 50 Ω-series characteristic impedance of the circuit board.

8. The millimeter-wave antenna according to claim 1, wherein
a dielectric lens in which a focal distance is controlled with a dielectric constant or a curvature is disposed in the second opening having an opening area to define a radiation range of the horn antenna.

9. The millimeter-wave antenna according to claim 8, wherein
the dielectric lens has a lens shape in which one surface is formed of a convex lens and another surface is formed to have a thickness of a linearly inclined shape, and deflects a radiation direction of a radio wave by a refraction effect.

10. A millimeter-wave sensor which is provided with at least one electric circuit among an RF circuit, an ADC/DAC, a DSP, and a power source circuit on a circuit board, transmits/receives an electric signal generated by the RF circuit using a horn antenna through a slit provided in a metal conductor of the circuit board and an impedance matching device, and serves as a sensor which calculates a speed component in the electric circuit based on a Doppler frequency detected from a difference in a transmitting and receiving signal.

11. The millimeter-wave sensor according to claim 10, wherein
a relative speed is calculated based on the Doppler frequency,
a plurality of millimeter-wave antennas, each of which includes the slit, the impedance matching device, and the horn antenna, are formed, and
separate millimeter-wave antennas are used in transmitting and receiving a millimeter-wave electric signal to improve isolation between transmitting and receiving circuits.

12. The millimeter-wave sensor according to claim 10, wherein
a millimeter-wave antenna including the slit, the impedance matching device, and the horn antenna includes the slit which is provided in a first metal conductor formed in a first surface of the circuit board, the horn antenna which is provided with a first opening and a second opening, and the impedance matching device of a slot shape which is provided between the slit and the first opening of the horn antenna.

* * * * *